United States Patent [19]

Aiba

[11] 4,421,195
[45] Dec. 20, 1983

[54] DEVICE FOR PREVENTING DISPLACEMENT OF AN ENGINE IN A MOTORCYCLE

[75] Inventor: Yasuaki Aiba, Sakado, Japan

[73] Assignee: Honda Giken Kogyo Kabushiki Kaisha, Tokyo, Japan

[21] Appl. No.: 337,548

[22] Filed: Jan. 6, 1982

[30] Foreign Application Priority Data

Jan. 9, 1981 [JP] Japan .................................. 56-1489

[51] Int. Cl.³ .............................................. B60K 5/12
[52] U.S. Cl. .................................... 180/228; 180/291
[58] Field of Search ...................... 180/228, 227, 291; 248/573, 574, 544

[56] References Cited

U.S. PATENT DOCUMENTS 3,542,146  11/1970  Hooper et al. ....................... 180/228

Primary Examiner—Joseph F. Peters, Jr.
Assistant Examiner—Donn McGiehan
Attorney, Agent, or Firm—Sughrue, Mion, Zinn, Macpeak and Seas

[57] ABSTRACT

A device for preventing displacement of an engine in a motorcycle having a driving chain adapted to transmit the rotation of the engine to a rear wheel, while the engine is mounted on a body frame by a plurality of mounting bolts each extending at one end through one of a plurality of holes formed in the engine, and a plurality of brackets attached to the frame. The device comprises a stop supported on the frame behind the engine, and means for damping the vibration of the engine. The damping means is provided on each of the mounting bolts adjacent to each end thereof, and fitted substantially in one of the holes in the engine. The stop includes an adjust bolt facing the rear end of the engine. The adjust bolt has a longitudinal axis located on a line joining the center of a sprocket on the output shaft of the engine and that of a sprocket on the axle of the rear wheel, and in a vertical plane in which the driving chain lies.

7 Claims, 2 Drawing Figures

DEVICE FOR PREVENTING DISPLACEMENT OF AN ENGINE IN A MOTORCYCLE

BACKGROUND OF THE INVENTION

This invention relates to a device for preventing displacement of an engine in a motorcycle.

Generally, an engine of a motorcycle is mounted on a body frame of the motorcycle through rubber members for dampering purposes. A number of brackets are attached to the frame, and a mounting bolt extends horizontally through each bracket along a transverse direction of the motorcycle. A generally cylindrical antivibratory rubber member encircles each end of each mounting bolt. The engine is provided with a plurality of mounting holes each receiving therein one antivibratory rubber member of one mounting bolt, whereby the engine is mounted on the frame in an anti-vibratory fashion.

The rotation of the engine is transmitted by a driving chain from a sprocket on its output shaft to a sprocket on the axle of a rear wheel. When the motorcycle is started, however, the driving force of the chain creates a counteraction which pulls the engine backward. The displacement of the engine causes excessive compression and deformation of the rubber members, and their gradual fatigue with a resultant loss of their anti-vibratory function. It also causes sagging of the driving chain, and the chain is likely to have a shortened service life.

SUMMARY OF THE INVENTION

It is an object of this invention to eliminate the aforesaid problems in the prior art, and provide a device which is simple in construction, and yet can effectively prevent any substantial displacement of a motorcycle engine that might otherwise result from the counteraction of the driving chain.

According to this invention, there is, thus, provided a device which essentially comprises a vibration damping means fitted about each bolt mounting an engine on a body frame, and provided adjacent to each end of the bolt, and a stop provided on the body frame behind the engine.

DETAILED DESCRIPTION OF THE INVENTION

Figure 1:
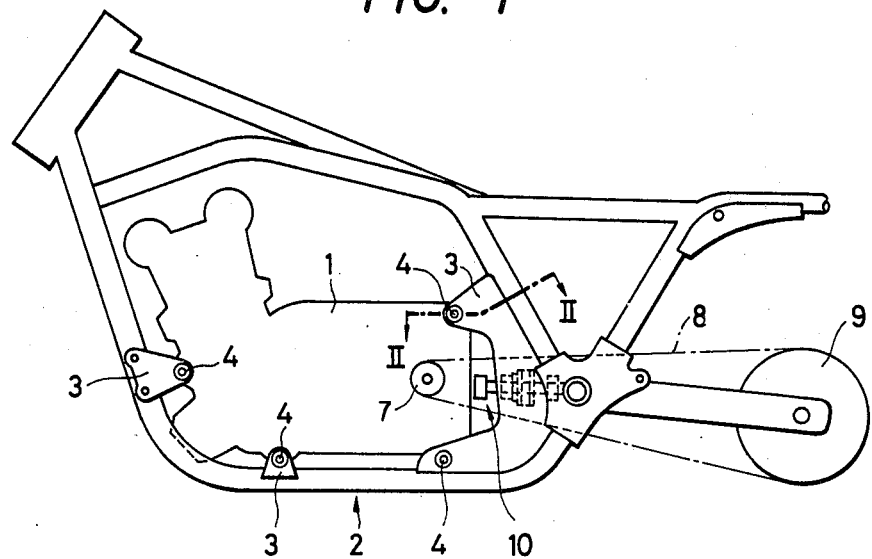
FIG. 1 is a side elevational view showing schematically an engine mounted on the body frame of a motorcycle, and a device embodying this invention.

Referring first to FIG. 1 of the drawings, there is shown an engine 1 mounted on a body frame 2 by a plurality of brackets 3 attached to the frame 2, and a plurality of mounting bolts 4 each supported at both ends thereof by a pair of brackets 3. The engine is provided with a plurality of holes 6 each adjacent to one of the brackets 3, and each mounting bolt 4 extends horizontally through a pair of holes 6. The rotation of the engine 1 is transmitted by a driving chain 8 from a sprocket 7 on its output shaft to a sprocket 9 on the axle of a rear wheel.

A device embodying this invention is schematically shown in FIG. 1, and includes a stop as generally indicated at 10. The stop 10 is positioned behind the engine 1, and between the sprockets 7 and 9. The stop 10 includes an arm 11 secured to one of the brackets 3 on the frame 2, a nut 12 secured to the arm 11 by, for example, welding and an adjust bolt 13 threadedly engaged with the nut 12, as shown in detail in FIG. 2. The adjust bolt 13 is situated on a line extending between the centers of the sprockets 7 and 9, and in a vertical plane in which the chain 8 is located. In other words, the adjust bolt 13 is located in a plane in which the chain 8 may exert a counteraction to pull the engine 1 backward. The adjust bolt 13 has one end facing the rear end of the engine 1, and spaced apart therefrom by a distance $d_1$ which is adjustable. A lock nut 14 encircles the adjust bolt 13, and engages the nut 12 to hold the adjust bolt 13 in position. A rubber cap 15 is preferably fitted about the one end of the adjust bolt 13 facing the engine 1 to damp any noise that may arise when the engine 1 abuts on the adjust bolt 13.

Figure 2:
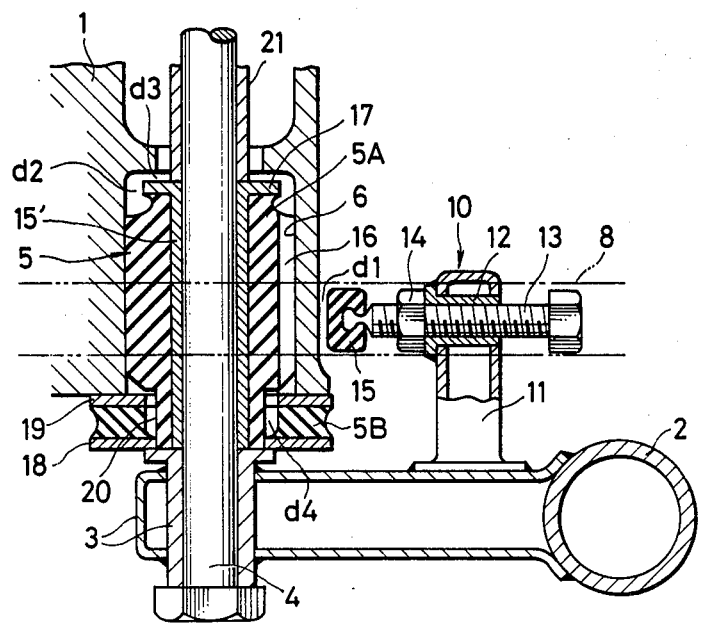
FIG. 2 is an enlarged, horizontal sectional view taken along the line II—II of FIG. 1.

The device of this invention further includes a vibration damping means provided in each hole 6 of the engine 1 as shown in FIG. 2. The vibration damping means comprises a rigid tubular member 15 fitted about the mounting bolt 4 in the hole 6, and a vibration damping rubber member 5 encircling the tubular member 15. The damping member 5 comprises a generally cylindrical portion 5A which is mainly adapted to absorb the vertical or longitudinal vibration of the engine 1, and an annular flange portion 5B adapted to absorb its transverse vibration. FIG. 2 shows the cylindrical and annular flange portions 5A and 5B which are separate from each other, but it is also possible to form them integrally with each other.

The cylindrical portion 5A comprises a generally cylindrical mass of rubber fused about the rigid tubular member 15' and secured thereto, and has an outer surface formed with a closely pitched, spiral groove 16 which provides allowance for deformation of the rubber. The spiral groove 16 ensures a uniform spring constant of the cylindrical portion 5A in any part thereof. The tubular member 15' terminates at one, or the inner end thereof in a diametrically outwardly projecting annular flange 17. The flange 17 is spaced apart from the peripheral surface of the hole 6 both radially as shown at $d_2$ and axially as shown at $d_3$ to such an extent that the clearances $d_2$ and $d_3$ may allow for some vibration of the engine 1, but resist any further vibration thereof to prevent any excessive compression or deformation of the rubber member 5.

The annular flange portion 5B comprises a pair of annular plates 18 and 19 of rigid material located between the engine 1 and the bracket 3, and an annular mass of rubber fused between the annular plates 18 and 19, and secured thereto. One or the inner annular plate 19 contacts the engine 1, while the other or outer annular plate 18 contacts the bracket 3.

The cylindrical portion 5A includes a cylindrical boss 20 formed integrally therewith, and extending outwardly from the hole 6. The boss 20 encircles the tubular member 15' adjacent to the outer end thereof, and is secured thereto. The boss 20 extends through the annular flange portion 5B, and is secured to the outer annular plate 18, while the inner annular plate 19 and the annular mass of rubber are spaced radially apart from the boss 20 by a distance $d_4$ defining an annular clearance which provides allowance for compression or deformation of the annular flange portion 5B.

A pair of devices according to this invention are provided on each mounting bolt 4 adjacent to the opposite ends thereof. A tubular spacer 21 encircles the mounting bolt 4 between the two devices to hold them in position, as is obvious from FIG. 2. The structure of the tubular member 15 and the vibration damping member 5 are described in detail in the commonly assigned copending U.S. application Ser. No. 337,554 filed on the same date of this application.

When, for example, the motorcycle is started, the driving chain 8 exerts a counteraction on the engine 1, and pulls it backward. According to this invention, however, the stop 10 abuts on the rear end of the engine 1 in any such event, and prevents any substantial displacement of the engine 1. Therefore, the rubber in the device is not excessively compressed or deformed, and sagging of the chain 8 is prevented.

Since the rubber is not excessively compressed or deformed, it is possible to use softer and more elastic rubber which produces improved vibration damping results, depending on the vibration characteristics of the engine.

What is claimed is:

1. In a device for preventing displacement of an engine in a motorcycle having a driving chain adapted to transmit the rotation of said engine to a rear wheel, said engine being mounted on a body frame by a plurality of mounting bolts each extending through one of a plurality of holes formed in said engine, and a plurality of brackets attached to said frame, the improvement which comprises:
    a stop supported on said frame behind said engine, said stop including an adjust bolt having a longitudinal axis located on a line joining a center of a sprocket on an output shaft of said engine and a center of a sprocket on the axle of said rear wheel, said longitudinal axis being located in a vertical plane in which said chain lies; and
    means for damping the vibration of said engine, said damping means being provided on each of said mounting bolts adjacent to each end thereof, and fitted substantially in each of said holes.

2. A device as set forth in claim 1, wherein said stop further comprises: an arm secured to one of said brackets; a nut secured to said arm; said adjust bolt being threadedly engaged with said nut, and having one end facing said rear end of said engine.

3. A device as set forth in claim 2, further comprising: a lock nut threadedly fitted about said adjust bolt, and engageable with said nut on said arm for holding said adjust bolt in position; and
    a rubber cap fitted over said one end of said adjust bolt.

4. A device as set forth in claim 1, wherein each of said damping means comprises:
    a rigid tubular member fitted about each of said mounting bolts in each of said holes formed in said engine; and
    a vibration damping rubber member encircling said rigid tubular member, said vibration damping rubber member comprising a generally cylindrical portion for absorbing vertical vibrations of said engine and an annular flange portion for absorbing traverse vibrations of said engine.

5. A device as set forth in claim 4, wherein said generally cylindrical portion comprises a mass of rubber fused about said rigid tubular member, said cylindrical portion having a spiral groove formed on an outer surface thereof, said rigid tubular member having an annular flange at one end thereof spaced apart from said corresponding hole in both a radial and an axial direction.

6. A device as set forth in claim 5, wherein said annular flange portion comprises a pair of annular plates made of rigid material located between said engine and said corresponding bracket, and an annular mass of rubber fused between said annular plates and secured thereto, one of said annular plates contacting said engine and the other of said annular plates contacting said corresponding bracket.

7. A device as set forth in claim 5, wherein said cylindrical portion includes a cylindrical boss which encircles said rigid tubular member and extends outwardly from said corresponding hole, said boss extending through said annular flange portion.

* * * * *